United States Patent
Friend

(10) Patent No.: US 11,520,009 B2
(45) Date of Patent: Dec. 6, 2022

(54) METHOD AND SYSTEM FOR DETECTING AN OBSTACLE

(71) Applicant: Caterpillar Inc., Peoria, IL (US)

(72) Inventor: Paul Friend, Morton, IL (US)

(73) Assignee: Caterpillar Inc., Peoria, IL (US)

( * ) Notice: Subject to any disclaimer, the term of this patent is extended or adjusted under 35 U.S.C. 154(b) by 339 days.

(21) Appl. No.: 16/782,980

(22) Filed: Feb. 5, 2020

(65) Prior Publication Data

US 2021/0239799 A1  Aug. 5, 2021

(51) Int. Cl.
| | |
|---|---|
| G01S 7/48 | (2006.01) |
| G01S 17/931 | (2020.01) |
| G01S 17/89 | (2020.01) |
| B60W 30/09 | (2012.01) |
| G05D 1/02 | (2020.01) |

(52) U.S. Cl.
CPC .......... *G01S 7/4802* (2013.01); *B60W 30/09* (2013.01); *G01S 17/89* (2013.01); *G01S 17/931* (2020.01); *B60W 2520/10* (2013.01); *B60W 2530/10* (2013.01); *B60W 2554/00* (2020.02); *G05D 1/0231* (2013.01)

(58) Field of Classification Search
CPC ...... G01S 7/4802; G01S 17/931; G01S 17/89; B60W 30/09; B60W 2554/00; B60W 2520/10; B60W 2530/10; G05D 1/0231
See application file for complete search history.

(56) References Cited

U.S. PATENT DOCUMENTS

| | | | |
|---|---|---|---|
| 5,714,928 A | 2/1998 | Sudo et al. | |
| 6,226,572 B1* | 5/2001 | Tojima | G05D 1/0297 |
| | | | 701/484 |
| 10,248,120 B1* | 4/2019 | Siegel | G05D 1/0022 |
| 10,816,977 B2* | 10/2020 | Zhang | B60W 30/00 |
| 2001/0021888 A1* | 9/2001 | Burns | G05D 1/0278 |
| | | | 701/26 |
| 2002/0099481 A1* | 7/2002 | Mori | G01C 21/12 |
| | | | 318/587 |
| 2007/0219720 A1* | 9/2007 | Trepagnier | G01S 17/931 |
| | | | 701/300 |

(Continued)

FOREIGN PATENT DOCUMENTS

| | | | | |
|---|---|---|---|---|
| CN | 107430406 A | * | 12/2017 | ........... B60T 7/00 |
| WO | WO-2016121688 A1 | * | 8/2016 | ........... G01S 17/42 |

(Continued)

*Primary Examiner* — Peter D Nolan
*Assistant Examiner* — Kenneth M Dunne
(74) *Attorney, Agent, or Firm* — Xsensus LLC

(57) ABSTRACT

A method for detecting an obstacle along a known path of a machine can include relating the location of the machine with a map. The map can include a worksite with a known path or known paths that the machine can travel on. The stopping distance of the machine can be determined and based on these identified known path and its characteristics along with a traveling speed and a weight of the machine. A LIDAR region of interest can be determined based on the stopping distance, the position and orientation of the machine, and characteristics of the known path. The machine can include a LIDAR system that can be configured to be oriented with respect to the LIDAR region of interest. A concentrated LIDAR scan can be performed to detect if an obstacle is present within the LIDAR region of interest.

19 Claims, 7 Drawing Sheets

(56) References Cited

U.S. PATENT DOCUMENTS

| | | | | |
|---|---|---|---|---|
| 2008/0167819 | A1* | 7/2008 | Breed | G08G 1/161 |
| | | | | 701/300 |
| 2009/0082949 | A1* | 3/2009 | Petrie | G06Q 10/08 |
| | | | | 701/119 |
| 2009/0216406 | A1* | 8/2009 | Senneff | A01B 69/007 |
| | | | | 701/41 |
| 2013/0060425 | A1* | 3/2013 | Makela | G05D 1/024 |
| | | | | 701/461 |
| 2016/0202698 | A1* | 7/2016 | Yamasaki | B61L 25/025 |
| | | | | 701/2 |
| 2017/0017238 | A1* | 1/2017 | Tojima | E21C 41/26 |
| 2017/0212513 | A1* | 7/2017 | Iida | B60W 50/02 |
| 2017/0236422 | A1* | 8/2017 | Naka | B60W 30/18163 |
| | | | | 701/301 |
| 2017/0307743 | A1* | 10/2017 | Izzat | G01S 13/42 |
| 2018/0067495 | A1* | 3/2018 | Oder | G05D 1/0231 |
| 2018/0328745 | A1* | 11/2018 | Nagy | G01C 21/3415 |
| 2019/0204423 | A1* | 7/2019 | O'Keeffe | G01S 17/89 |
| 2019/0286923 | A1* | 9/2019 | Wang | G06T 7/70 |
| 2021/0048818 | A1* | 2/2021 | Funke | B60W 60/0011 |
| 2021/0188312 | A1* | 6/2021 | Shikari | B60W 30/0956 |
| 2021/0232137 | A1* | 7/2021 | Whitfield, Jr. | G05D 1/0297 |

FOREIGN PATENT DOCUMENTS

| | | | |
|---|---|---|---|
| WO | 2018164203 | A1 | 9/2018 |
| WO | WO-2021151492 | A1 * | 8/2021 |

\* cited by examiner

METHOD AND SYSTEM FOR DETECTING AN OBSTACLE

TECHNICAL FIELD

The present disclosure generally pertains to machines, and is directed towards a method and system for detecting an obstacle along a known path of a machine.

BACKGROUND

Machines, such as dozers, motor graders, wheel loaders, wheel tractor scrapers, haul trucks and other types of heavy equipment, are used to perform a variety of tasks at a worksite. Control of these machines can utilize information received from various machine systems. For example, based on machine movement input, terrain input, and/or machine operational input, a machine can be controlled to complete a programmed task. By receiving appropriate feedback from each of the different machine systems during performance of the task, continuous adjustments to machine operation can be made to ensure precision and safety in completion of the task. In order to do so, some systems may be focused on specific areas of interest and may improve efficiency and accuracy of a machine system.

U.S. Pat. No. 5,714,928 to Sudo et. al describes a collision preventing system for a vehicle with a brake system. The system includes a first preview sensor detecting an obstacle in front of the vehicle in a first distal detection zone to produce a first signal indicative of presence of the obstacle and the distance between the obstacle and the front end of the vehicle. A second preview sensor detects the obstacle in front of the vehicle in a second proximal detection zone to produce a second signal indicative of at least presence of the obstacle. The system further includes a third vehicle speed sensor detecting vehicular traveling speed and generating a vehicle speed indicative signal. A control unit is connected to the first and second preview sensors for receiving the first and second signals. The control unit is responsive to the first signal for deriving a vehicular deceleration pattern for stopping the vehicle without colliding with the obstacle on the basis of the distance between the obstacle and the front end of the vehicle and the vehicle speed indicated by the vehicle speed indicative signal, and responsive to the second signal for operating the brake system for instant stop of the vehicle.

The present disclosure is directed toward improvements in the art.

SUMMARY

A method of detecting an obstacle is disclosed herein. In embodiments, the method includes determining position and orientation of a machine and relating the position and orientation of the machine with a map having at least one known path. The method further includes determining a stopping distance of the machine based on the position and orientation of the machine, the map, and a traveling speed and a weight of the machine. The method further includes determining a LIDAR region of interest based on the stopping distance, the position and orientation of the machine, and the at least one known path of the map. The method further includes configuring a LIDAR system orientation for a LIDAR system of the machine based on the determined LIDAR region of interest. The method further includes performing a concentrated LIDAR scan on the determined LIDAR region of interest to generate LIDAR scan data. The method includes performing ground plane segmentation based on the LIDAR scan data. The method further includes detecting if an obstacle is present within the LIDAR region of interest based on the ground plane segmentation.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. In some instances, well-known structures and components are shown in simplified form for brevity of description.

Figure 1:
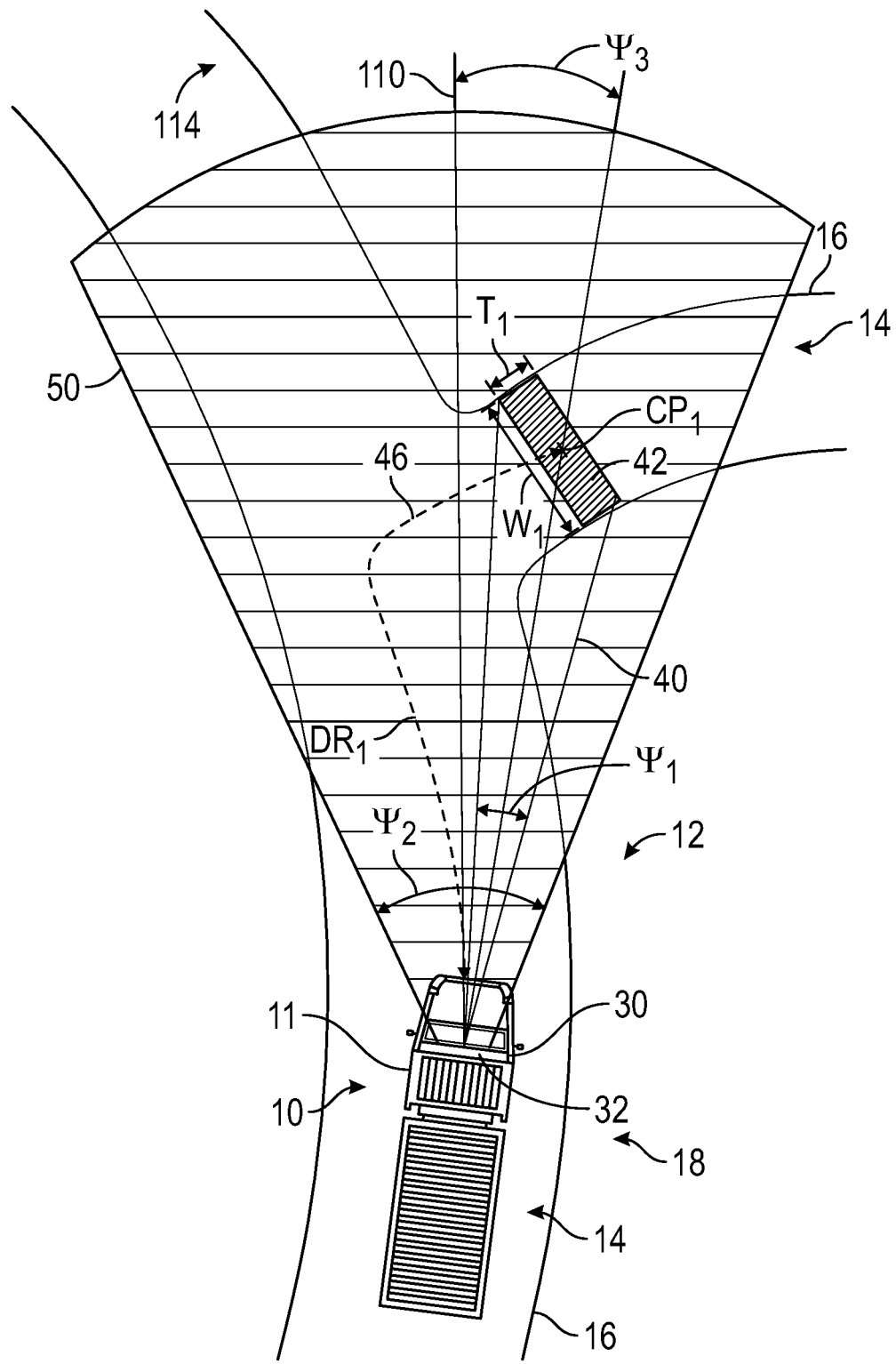
FIG. 1 is an illustration of an exemplary machine located on a first known path and a LIDAR system scanning the first known path for obstacles.

FIG. 1 is an illustration of an exemplary machine located on a first known path and a LIDAR system scanning the first known path for obstacles. Machine 10 may be a mobile machine that performs one or more operations associated with an industry, such as mining, construction, farming, transportation, or any other industry, at a worksite 12. For example, machine 10 may be a load-moving machine, such as a haul truck, a loader, an excavator, or a scraper. Machine 10 may be manually controlled, semi-autonomously controlled, or fully-autonomously controlled. Machine 10 may generally include a body 11, a power source (not shown), and an obstacle detection system 30. The machine 10 can have a machine orientation axis 110 that can be centered on the machine's longitudinal axis.

Worksite 12 may be a mine site or any other type of worksite traversable by the machine 10. In some embodiments, worksite 12 may include various features. Exemplary features of worksite 12 may be a known path 14, path edges 16, restricted operating areas 18, and any other objects such as work signs, poles, dirt mounds, trees, and/or other machines, etc. or portions of such. Features may have various colors and/or shapes. The known path 14 can be a path from a source to a destination. In some situations, the ground of worksite 12 may be relatively flat. In other situations, the ground of worksite 12 may include variations in the contour of the ground and may include ditches and potholes. The ground of worksite 12 may include objects that protrude from the surface of the ground, such as rocks or any other objects.

The obstacle detection system 30 may include a light detection and ranging (LIDAR) system 32. In an embodiment, the LIDAR system 32 can perform a concentrated LIDAR scan that produces a concentrated field 40 (sometime referred to as a first concentrated field) and perform a broad LIDAR scan that produces a broad field 50 simultaneously. In other examples there are multiple LIDAR systems 32 that can produce concentrated fields 40 and broad fields 50 individually. In yet another example, the LIDAR system 32 can alternate between producing a concentrated field 40 and a broad field 50 in a variety of orders and scan time windows. In an example, the LIDAR system 32 can include multiple lasers and detectors. In examples the LIDAR system 32 can be static or can spin. In an example, the concentrated field 40 can be generated by using fewer number of laser beams. Conversely, a greater number of laser beams are used to generate broad field 50. In other examples the concentrated scan 40 can be generated by a laser beam that is oriented via a mirror and can be split.

The LIDAR system 32 can produce the concentrated field 40 that is concentrated at a LIDAR region of interest 42 (sometimes referred to as the first region of interest). The LIDAR region of interest 42 can be located along a known route 46 (sometimes referred to as the primary known route) on the known path 14. The known route 46 can represent the route the machine 10 plans on taking. The LIDAR region of interest 42 can have defined area with a region of interest center point CP1 (sometimes referred to as the first region of interest center point) located at the center of the LIDAR region of interest 42. The LIDAR region of interest 42 can be located at a region of interest route distance DR1 from the machine 10 along the known route 46. The LIDAR region of interest 42 can have a width W1 similar to a width of the known path 14 proximate to the region of interest center point CP1. The LIDAR region of interest 42 can have width W1 similar to the distance between two path edges 16 proximate to the region of interest center point CP1. The LIDAR region of interest 42 can have a thickness T1. The thickness T1 can be set at a predetermined value. The thickness T1 can vary based on the width W1 and a predetermined maximum area value of the LIDAR region of interest 42. In an example, the width W1 can vary based on the thickness T1 and a predetermined maximum area value of the LIDAR region of interest 42.

The concentrated field 40 can have a concentrated field of view angle $\Psi 1$. The concentrated field of view angle $\Psi 1$ can be widened or narrowed and may depend on the width W1 of the LIDAR region of interest 42, the distance between the region of interest center point CP1 and the LIDAR system 32, thickness T1 of the LIDAR region of interest 42, number of available lasers, and/or other variables.

The LIDAR system 32 can be oriented at a LIDAR yaw angle $\Psi 3$. The LIDAR yaw angle $\Psi 3$ can be based on the location of the region of interest center point CP1 with respect to the machine orientation axis 110. In an embodiment, the LIDAR yaw angle $\Psi 3$ is configured to align the LIDAR system 32 such that the concentrated field 40 is generally aligned with the region of interest center point CP1. In an example, the LIDAR yaw angle $\Psi 3$ is configured to align the LIDAR system 32 such that the concentrated field 40 is generally centered between the region of interest center point CP1 and the machine orientation axis 110.

The LIDAR system 32 can produce the broad field 50 in addition to the concentrated field 40. The broad field 50 can have can have a coverage area based on a broad field of view angle $\Psi 2$ and a broad scanning distance. In an example the broad field of view angle $\Psi 2$ is predetermine and is set at a constant value. In other examples the broad field of view angle $\Psi 2$ is based on the broad scanning distance. In an example, the broad field 50 can be centered along the same orientation as the concentrated field 40. In another example, the broad field 50 can be centered along the same orientation as the machine orientation plane 110. In yet another example, the broad field 50 can have its own orientation.

In an embodiment, the broad field 50 can capture 90 degrees of the area surrounding of the machine 10. In some embodiments, the LIDAR system 32 may generate a point cloud scan data that captures a full 360 degrees of the area surrounding the machine 10 or any portion of the surroundings.

Figure 2:
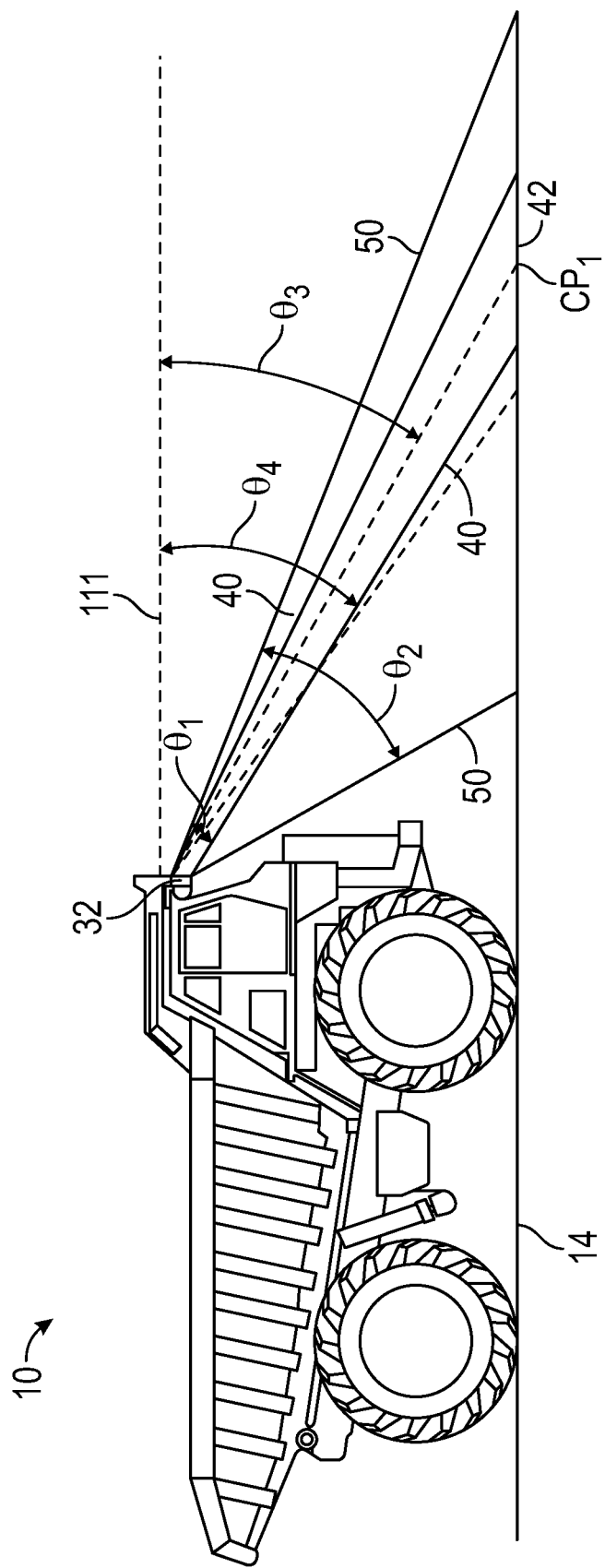
FIG. 2 is a side view of the machine and LIDAR system from FIG. 1.

FIG. 2 is a side view of the machine and LIDAR system 32 from FIG. 1. The machine 10 can have a pitch orientation axis 111. The pitch orientation axis 111 represents the general pitch orientation of the machine 10.

The pitch field of view of the concentrated field 40 can be configured by a concentrated pitch angle $\theta 1$. The LIDAR system 32 can be configured to adjust the concentrated pitch angle $\theta 1$ to match dimensions and/or geometry of the LIDAR region of interest 42, for example width W1. The pitch orientation of the concentrated field 40 can be configured by a concentrated pitch orientation angle $\theta 3$. The concentrated pitch orientation angle $\theta 3$ can be the angular difference between the pitch orientation axis 111 and the pitch center line of the concentrated field 40. In an embodiment, the LIDAR system 32 can be oriented to the region of interest center point CP1.

The pitch field of view of the broad field 50 can be configured by a broad pitch angle $\theta 2$. The LIDAR system 32 can be configured to adjust the broad pitch angle $\theta 2$ to provide the desired coverage area of the broad field 50. The pitch orientation of the LIDAR system 32 can be configured by a broad pitch orientation angle $\theta 4$. The broad pitch orientation angle $\theta 4$ can be the angular difference between the pitch orientation axis 111 and the pitch center line of the broad field 50.

Figure 3:
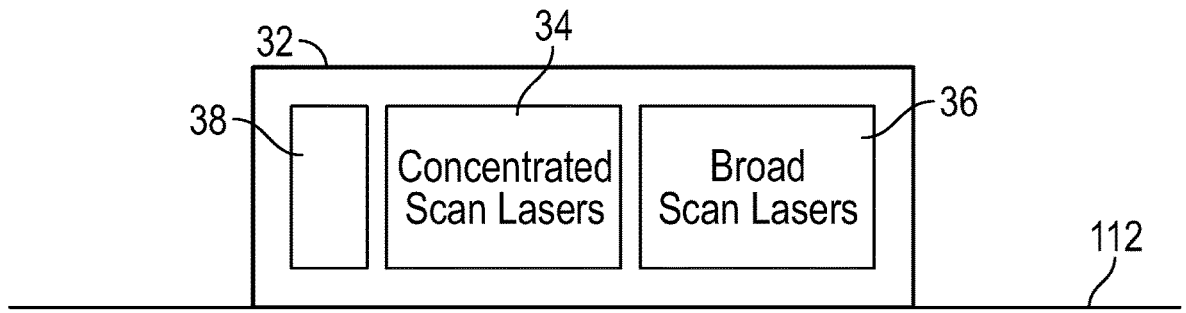
FIG. 3 is a functional block diagram of the LIDAR system from FIG. 1.

FIG. 3 is a functional block diagram of the LIDAR system from FIG. 1. The machine 10 can have a roll orientation axis 112 that represents the general roll orientation of the machine 10.

The LIDAR system 32 may include a plurality of light sources, such as lasers. Each laser may generate a laser beam which is directed at various points of worksite 12. The LIDAR system 32 may further include one or more detector devices that receive the laser beams after reflection off of various points of worksite 12. Based on the time between generating the laser beam and receiving the reflected laser beam (referred to as time-of-flight measurements), the obstacle detection system 30 may determine a location to the corresponding point.

In such a manner, obstacle detection system 30 may generate point cloud data representative of a part of worksite 12 that is detected by LIDAR system 32. Point cloud data is a set of points around the external surfaces of an object of interest. The point clouds are used for detection of an object of interest, such as the obstacle 66. Each data point in this LIDAR scan data may include location data from the LIDAR system 32 to a detected point of worksite 12. In an exemplary embodiment, LIDAR system 32 may include 64 lasers, which may collectively obtain approximately one million points per LIDAR scan. In other embodiments, LIDAR system 32 may include more or less than 64 lasers and/or obtain more or less points per LIDAR scan. In one embodiment of the disclosed invention the number of lasers employed for a scan may modified based on a predetermined condition. For example, poor road visibility, adverse climatic conditions, rough road conditions, and the like.

The lasers can be divided into a group of concentrated scan lasers 34 and a group of broad scan lasers 36. The group of concentrated scan lasers 34 can be used for the concentrated field 40 (shown in FIG. 1 and FIG. 2) and the group of broad scan lasers 36 can be used for the broad field 50 (shown in FIG. 1 and FIG. 2). The number of lasers included in the group of concentrated scan lasers 34 can be selected to produce a concentrated field 40 with enough scan resolution to detect obstacles of a predetermined size or greater along the known path 14 (shown on FIG. 1 and FIG. 2). For example, the predetermined obstacle size can be objects and/or voids larger than 100 cm^2.

The LIDAR system 32 can be configured by a position and orientation system 38, such as a nodder. The position and orientation system 38 can include servomotors and other mechanisms (e.g., stepper motors) to adjust the position and orientation of the LIDAR system 32.

Figure 4:
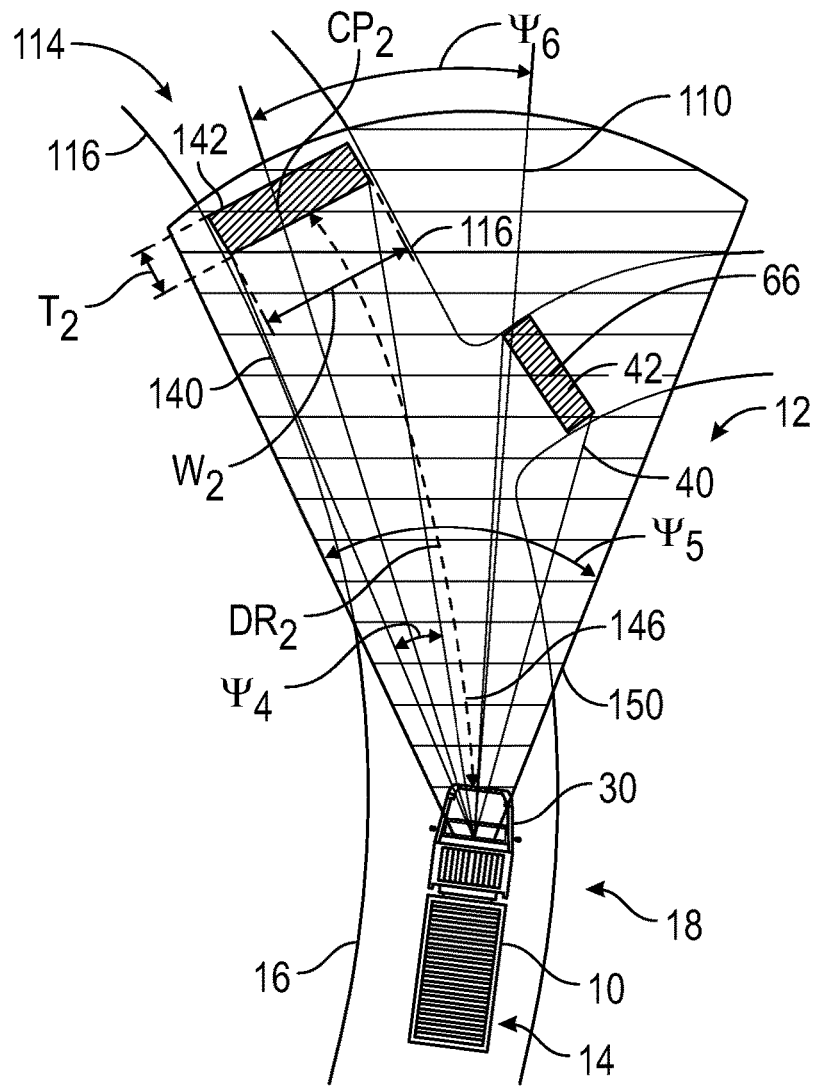
FIG. 4 is an illustration of the machine and the LIDAR system from FIG. 1 scanning a second known path for obstacles.

FIG. 4 is an illustration of the machine 10 and the LIDAR system 32 from FIG. 1 scanning a second known path for obstacles. The worksite 12 can include a second known path 114 and path edges 116. The second known path 114 can branch off of the first known path 14. The worksite 12 may include an obstacle 66. The obstacle 66 may be located along the first known path 14 and primary known route 46. In an embodiment, the obstacle is located within the first LIDAR region of interest 42 and is detected by the obstacle detection system 30.

In an embodiment, the LIDAR system 32 can perform a LIDAR scan that produces a first concentrated field 40, a second concentrated field 140, and a broad field 50 simultaneously. In other examples, there are multiple LIDAR systems 32 that can produce first concentrated fields 40, second concentrated fields 140, and broad fields 50 individually. In an embodiment, the first concentrated field 40 and the second concentrated field 140 can be based on using a total of lasers fewer than the broad field 50.

The LIDAR system 32 can produce the second concentrated field 140 that is concentrated at a second region of interest 142. The second region of interest 142 can be located along a secondary known route 146 on the second known path 114. The second region of interest 142 can have a defined area with a second region of interest center point CP2 located at the center of the second region of interest 142. The second region of interest 142 can be located at a second region of interest route distance DR2 from the machine 10 along the secondary known route 146. The second region of interest 142 can have a width similar to a width W2 of the second known path 114 proximate to the second region of interest center point CP2. The second region of interest 142 can have a width W2 similar to the distance between two path edges 116 proximate to the second region of interest center point CP2. The second region of interest 142 can have a thickness T2. The thickness T2 can be set at a predetermined value. The thickness T2 can vary based on the width W2 and a predetermined maximum area value of the second region of interest 142. In an example, the width W2 can vary based on a predetermined thickness T2 and a predetermined maximum area value of the second region of interest 142.

The second concentrated field 140 can have a concentrated field of view angle $\Psi 4$. The concentrated field of view angle $\Psi 4$ can be widened or narrowed and may depend on the width W2 of the second region of interest 142, the distance between the second region of interest center point CP2 and the LIDAR system 32, the thickness T2 of the second region of interest 142, and/or other variables.

The LIDAR system 32 can be oriented at a LIDAR yaw angle $\Psi 6$. The LIDAR yaw angle $\Psi 6$ can be based on the location of the second region of interest center point CP2 with respect to the machine orientation axis 110.

The LIDAR system 32 can produce a second broad field 150 in addition to the second concentrated field 140. The LIDAR system 32 can produce multiple concentrated scans such as three, four, five, six, or more scans and/or multiple broad scans such as two, three, four, fix, six, or more scans.

Figure 5:
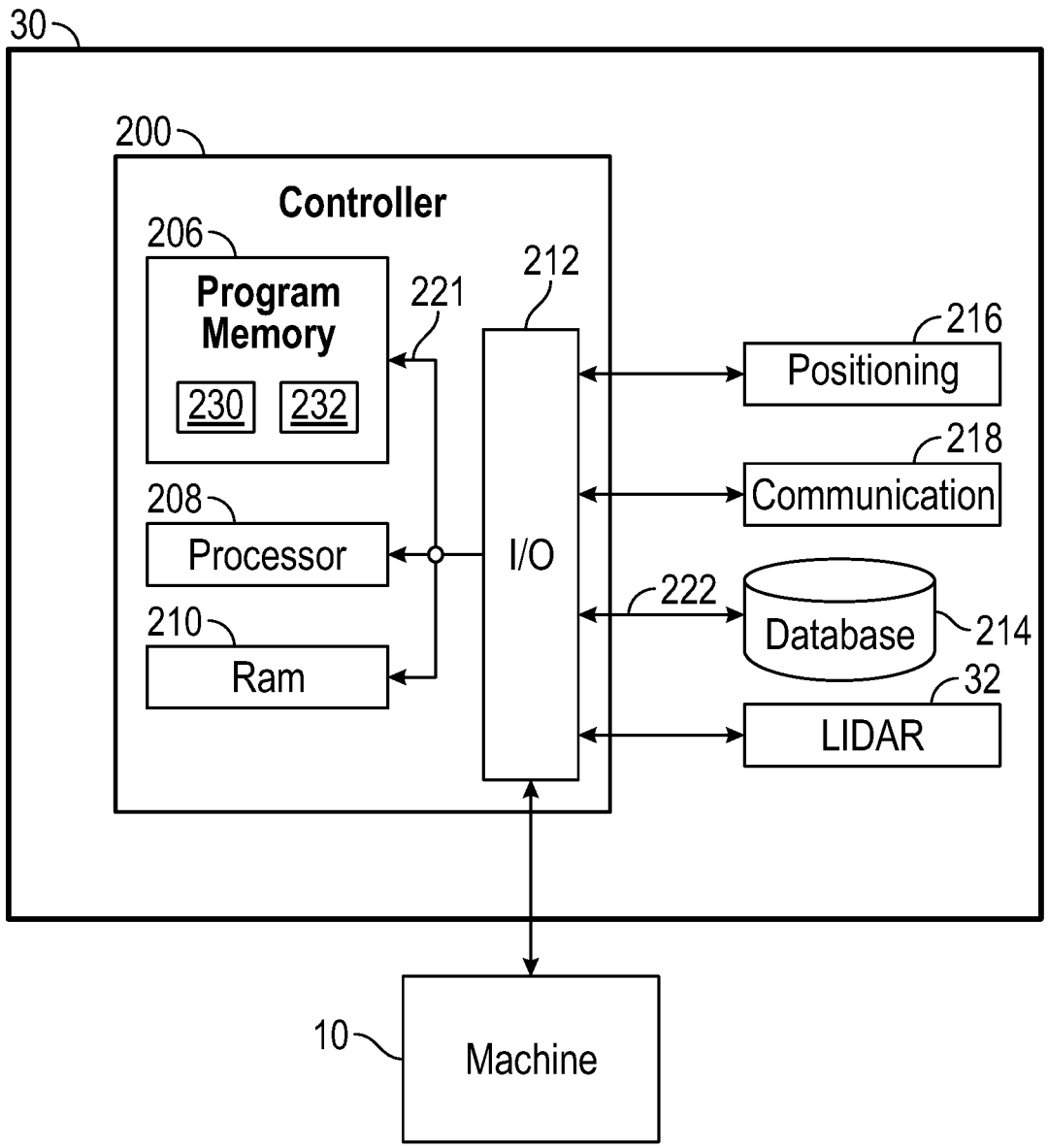
FIG. 5 is a functional block diagram of an object detection system.

FIG. 5 is a functional block diagram of a control system. In embodiments, the obstacle detection system 30 includes the LIDAR system 32 and a control system 200 (sometimes referred to as a controller). In certain embodiments, the control system 200 is in communication with the LIDAR system 32 and the machine 10. For example, via wired connections and/or wirelessly. In embodiments, the LIDAR system 32 can include a computer such as the control system 200. In embodiments the machine 10 can include its own machine control system for other operations of the machine 10. The control system 200 can be connected to the machine 10 such that information can be sent and received to and from the control system 10 and the machine 10. The control system 200 can instruct the machine 10 and its component, such as controlling the brakes of the machine 10 or controlling the steering of the machine 10.

The control system 200 can include a positioning system 216 for identifying the position and orientation of the machine 10. In embodiments the positioning system 216 may include a Global Positioning System (GPS), Global Navigation Satellite System (GNSS), inertial sensors, ranging radios, or other perception based localization methods which may leverage LIDAR, cameras, radars, or stereo cameras.

The control system 200 can be operatively connected to a database 214 via a link 222 connected to an input/output (I/O) circuit 212. It should be noted that, while not shown, additional databases 214 may be linked to the control system in a known manner. Furthermore, these databases 214 may be external to the control system 200. In an example the database 214 includes three dimensional information such x, y, z coordinates or latitude, longitude, and elevation. In an example, the databases 214 can include a map or multiple maps of the worksite 12. The term "map" is intended to include digital map data. The map can include location and dimensional data relating to known paths, such as the first known path 14 and the second known path 114. The map can include relative coordinates and can be relative to navigation systems such as the (GNSS). The map can include location and dimensional data relating to known routes, such as the primary known route 46 and the secondary known route 146. The map can include location and dimensional data relating to worksite features, such as known path edges 16. The map can include location and dimensional data relating to detected or known obstacles and adverse conditions along known routes. The map can include longitude and latitude data along with elevation data. The map or multiple maps can be stored locally on the machine 10 or can be located separate from the machine and accessed remotely. The control system 200 can include a communication module 218 that can provide information to the database 214 such as road network information.

The control system 200 can include a program memory 206, the processor 208 (may be called a microcontroller or a microprocessor), a random-access memory (RAM) 210, and the input/output (I/O) circuit 212, all of which are interconnected via an address/data bus 221. It should be appreciated that although only one microprocessor 208 is shown, the c control system 200 may include multiple microprocessors 208. Similarly, the memory of the control system 200 may include multiple RAMs 210 and multiple program memories 206. Although the I/O circuit 212 is shown as a single block, it should be appreciated that the I/O circuit 212 may include a number of different types of I/O circuits. The RAM(s) 210 and the program memories 206 may be implemented as semiconductor memories, magnetically readable memories, nonvolatile memories, and/or optically readable memories, for example.

The program memory 206 and RAM 210 can be a non-transitory computer-readable medium having stored thereon computer-executable code (e.g., disclosed software or subroutines) and/or data. The program memory 206 and/or the RAM 210 may store various applications (i.e., machine readable instructions) for execution by the microprocessor 208. For example, an operating system 230 may generally control the operation of the control system 200 and provide a computing environment to implement the processes described herein. The program memory 206 and/or the RAM 210 may also store a variety of software 232 for accessing specific functions of the control system 200.

The software 232 may include code to execute any of the operations described herein. The program memory 206 and/or the RAM 210 may further store data related to the configuration and/or operation of the control system 200, and/or related to the operation of the software 232.

INDUSTRIAL APPLICABILITY

Embodiments of the present disclosure relate to obstacle detection systems 30 for machines 10 such as haul trucks, and systems, components, and methods thereof. The disclosed obstacle detection system 30 can include a LIDAR system 32 and a control system 200 that can perform the methods described herein.

Figure 6:
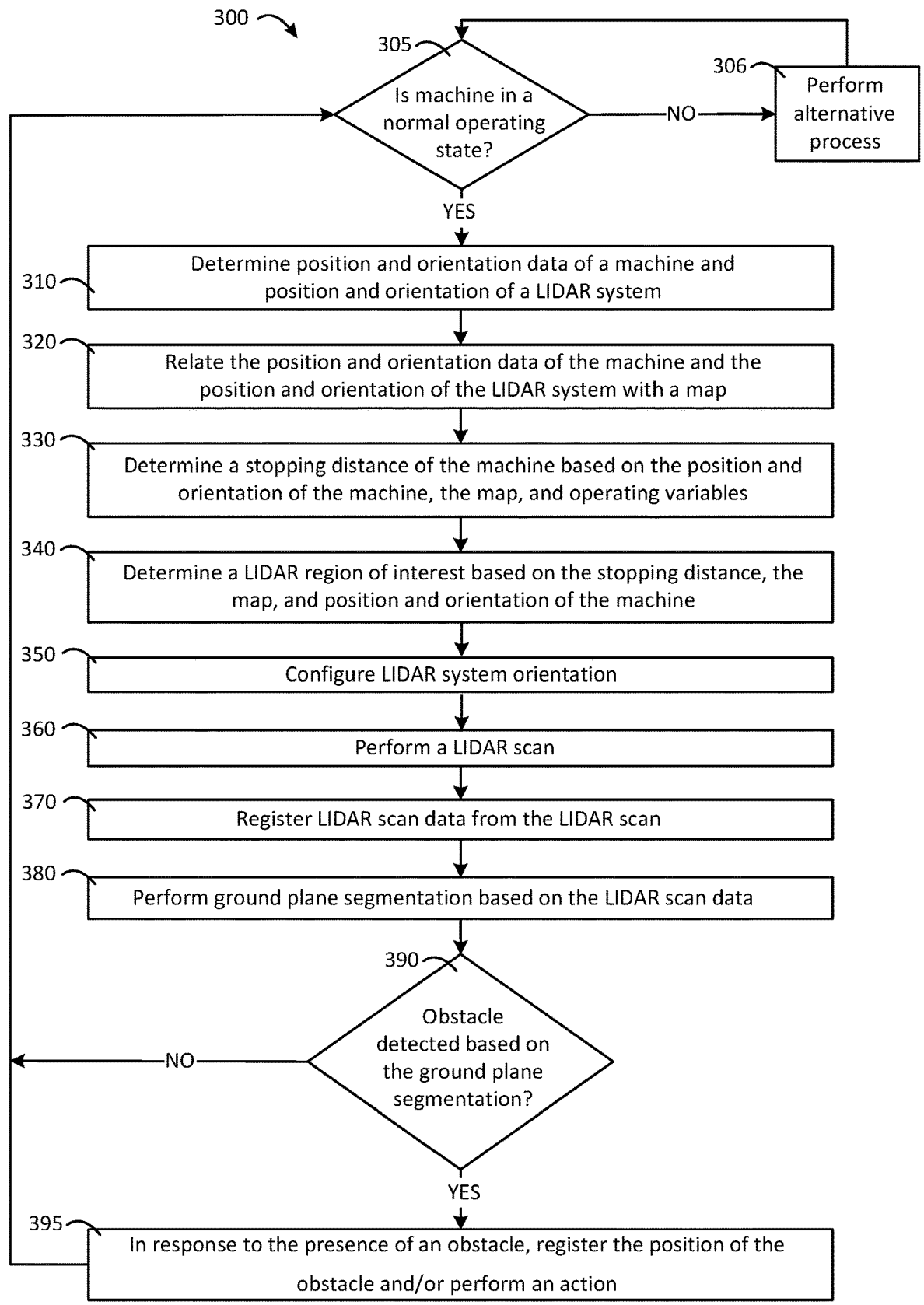
FIG. 6 is a flowchart of a method of detecting an obstacle.

FIG. 6 is a flowchart of a method of detecting an obstacle. The process 300 begins at block 305 to check if the machine 10 is operating in a normal operating state. In an embodiment, the control system 200 performs block 305. If the machine 10 is not in a normal operating state, then the method proceeds to block 306 and an alternative process can be performed before returning to block 305. In an embodiment, the control system 200 determines position and orientation of the machine and position and orientation of the LIDAR system. In an example, performing an alternative process of block 306 can consist of pausing for a predetermined amount of time before executing block 305 again.

If the machine 10 is operating in a normal operating state, the method can proceed to block 310. At block 310, the control system 200 can determine position and orientation of the destination bound machine 10 and position and orientation of the LIDAR system 32 with respect to a map. In an example the position of the machine 10 and/or LIDAR system 32 are determine using positioning system 216. In an example the orientation of the machine 10 and/or LIDAR system 32 are determined based on changes of the corresponding positions of the machine and/or LIDAR system 32 over a progression of time. In an example the orientation of the machine 10 and/or the LIDAR system 32 can be based on predetermined references such as North, South, East, West, or other included references such as objects or feature located on the worksite 12.

In an example, the position coordinates and therefore the position data of the LIDAR system 32 can remain constant with respect to the overall machine 10 and can be dependent on the position coordinates and position data of the machine 10. In other examples, the LIDAR system 32 can move, for example side to side or up and down, with respect to the machine position to provide additional visibility to the known path 14 and the LIDAR region of interest 42. Similarly, in an example, the orientation of the LIDAR system 32 can remain constant with respect to the overall machine 10 and can be dependent on the machine 10 position and orientation. In other examples, the LIDAR system 32 can pan, tilt, and/or roll with respect to the machine orientation to provide additional control for configuring the concentrated field 40 and the broad field 50.

The method can further proceed to block 320. At block 320, the control system 200 can relate the position and orientation of the machine 10 and the position and orientation of the LIDAR system 32 with a map. The map can include a known path or multiple known paths that lead from the current position of the machine 10 to the desired destination of the machine 10. The map can be part of the database 214. With the map, location and dimensional data related to the known path or paths can be related with the position and orientation of the machine 10. Similarly, location and dimensional data related to the known path or paths can be related with the position and orientation of the LIDAR system 32 on the map. The map can provide general reference to each group of data. In an example the map includes information relating to path width, path slope and terrain, and path condition.

The method can further proceed to block 330. At block 330, the control system 200 can determine a stopping distance of the machine based on the position and orientation of the machine, the map, and operating variables. The map can include data relating to the route slope along the known paths, known path conditions, and location of obstacles 66.

The operating variables can include speed of the machine 10, weight of the machine 10, road conditions, weather and visibility conditions, and the performance and condition of the machine 10. A route with a hard compact surface can allow for a shorter stopping distance than a route that has a soft and loose surface or has ditches, bumps, and/or potholes. A machine 10 traveling uphill can lead to a shorter stopping distance than a machine traveling on flat ground or downhill. A machine 10 traveling at slower speeds can have a stopping distance less than a machine traveling at faster speeds. A rainy, snowy, or foggy day can reduce the visibility performance of a LIDAR system 32 and may reduce the allowable operating speed of the vehicle and reduce the stopping distance in comparison to a clear day. A heavier total weight/payload weight can lead to a longer stopping distance than a total weight that is lighter. The type of brakes and tires used on a machine can relatively increase or decrease stopping distance performance. Worn tires and brakes can lead to a longer stopping distance than new tires and brakes. A factor of safety can also be applied to the stopping distance determination.

The method can further proceed to block 340. At block 340, the control system 200 can determine a LIDAR region of interest 42 with regards to the stopping distance, the map, and position and orientation of the machine 10. The LIDAR region of interest 42 can have a region of interest center point CP1. The region of interest center point CP1 can be located by measuring from the machine location out along a known route 46 at a distance equal to the stopping distance. In an example, the coverage area of the LIDAR region of interest 42 can be limited to a maximum area value. The width W1 of the LIDAR region of interest can be the first known path width. In other examples, the width W1 can be based on the width of the machine 10 or other predetermined values or ratios. The thickness T1 of the LIDAR region of interest 42 can be based on the number of lasers used in the concentrated field 40 and/or the width W1 of the LIDAR region of interest.

The method can further proceed to block 350. At block 350, the control system 200 can configure the LIDAR system orientation for the LIDAR system 32 of the machine 10 based on the location and dimensions of the LIDAR region of interest 42. In an example, the LIDAR system 32 can be configured based on the previous orientation of the LIDAR system 32. In examples, the orientation of the LIDAR system 32 can be configured based on the previous position of the LIDAR system. In an example, the orientation of the LIDAR system 32 can be configured internally by controlling a scan pattern to concentrate on the region of interest 42 and 142, for example with steerable mirrors, slits, and/or other adjustable components. In other examples, the orientation of the LIDAR system 32 can be configured by moving the LIDAR system 32, for example with the position and orientation system 38. Orientation of the LIDAR system 32 can include adjusting the focus of the LIDAR system 32 to concentrate on the region of interest 42 and 142.

The method can further proceed to block 360. At block 360, the LIDAR system 32 can perform a LIDAR scan, such as a first concentrated field 40 (FIGS. 1, 2, 4) and a second concentrated field 140 (FIG. 4). The LIDAR scan can be on the determined LIDAR region of interest 42 and 142 to generate LIDAR scan data. In an example the LIDAR system orientation can be based on the relating of the position and orientation of the LIDAR system 32 and the map. An additional LIDAR scan can be performed, such as a broad field 50 (FIGS. 1, 2, 4). The broad field 50 can be based on a field of view angle Ψ2 and a broad scanning distance.

The method can further proceed to block 370. At block 370, the control system 200 can register the LIDAR scan data from the LIDAR scan. The data from the LIDAR scan can be received and stored by the control system 200 to be used during block 380.

The method can further proceed to block 380. At block 380, the control system 200 can perform a ground plane segmentation operation based on the LIDAR scan data. The ground plane segmentation operation can piece together an image of the scanned region of interest 42 and 142.

The method can further proceed to block 390. At block 390, the control system 200 can check if an obstacle is detected within the LIDAR region of interest 42 and 142 based on the ground plane segmentation operation. If an obstacle 66 is not detected, the method proceeds to the beginning and starts again at block 305. If there is no obstacle 66 detected, the control system 200 can save the ground plane segmentation information and the location of the LIDAR region of interest 42 and 142, such as referenced with the map. A known path 14 and 114 and known route 46, 146 may be selected based on the recorded regions of interest 42 and 142 without a detected obstacle 66. If an obstacle 66 is detected within the LIDAR region of interest 42 and 142, the method proceeds to block 395.

At block 395, the control system 200 can register the position of the obstacle and/or perform an action. The position of the obstacle 66 can be saved and referenced with the map. With the obstacle position saved, other machines operating on the same known path 14 and primary known route 46 can drive around or over the obstacle or plan to use an alternative path such as a second known path 114 and secondary known route 146. Similarly, with the obstacle position saved, the machine 10 traveling on the same known path 14 and primary known route 46 can drive around or over the obstacle or plan to use an alternative path such as a second known path 114 and secondary known route 146. The machine 10 can perform other actions after the obstacle detection system 30 detects an obstacle 66, such as signal the location of the obstacle to a machine operator within the machine 10 or located remotely to the machine 10, trigger a notification to the machine operator, and/or slow down the traveling speed of the machine 10.

Figure 7:
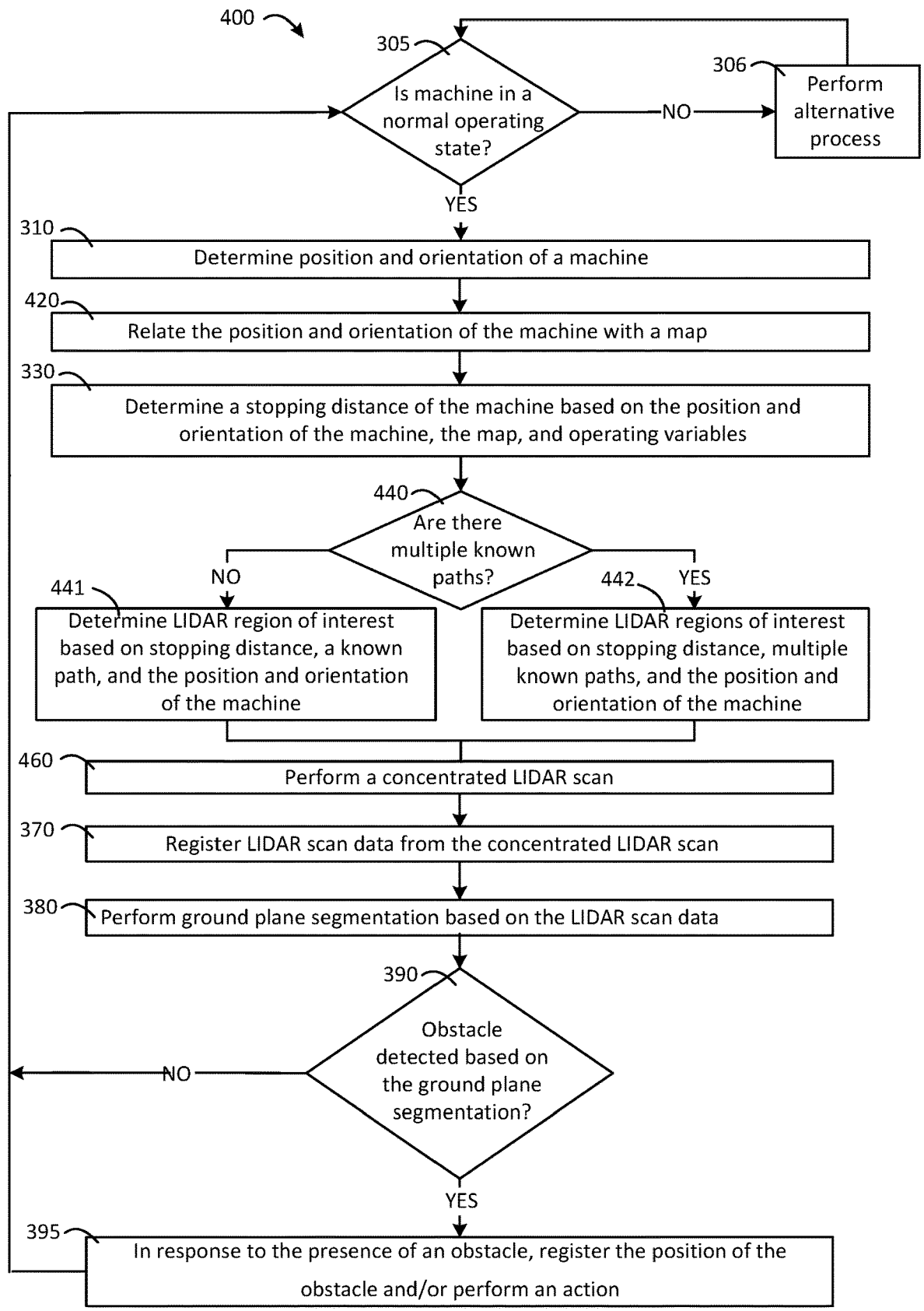
FIG. 7 is a flowchart of another method of detecting an obstacle.
Figure 8:
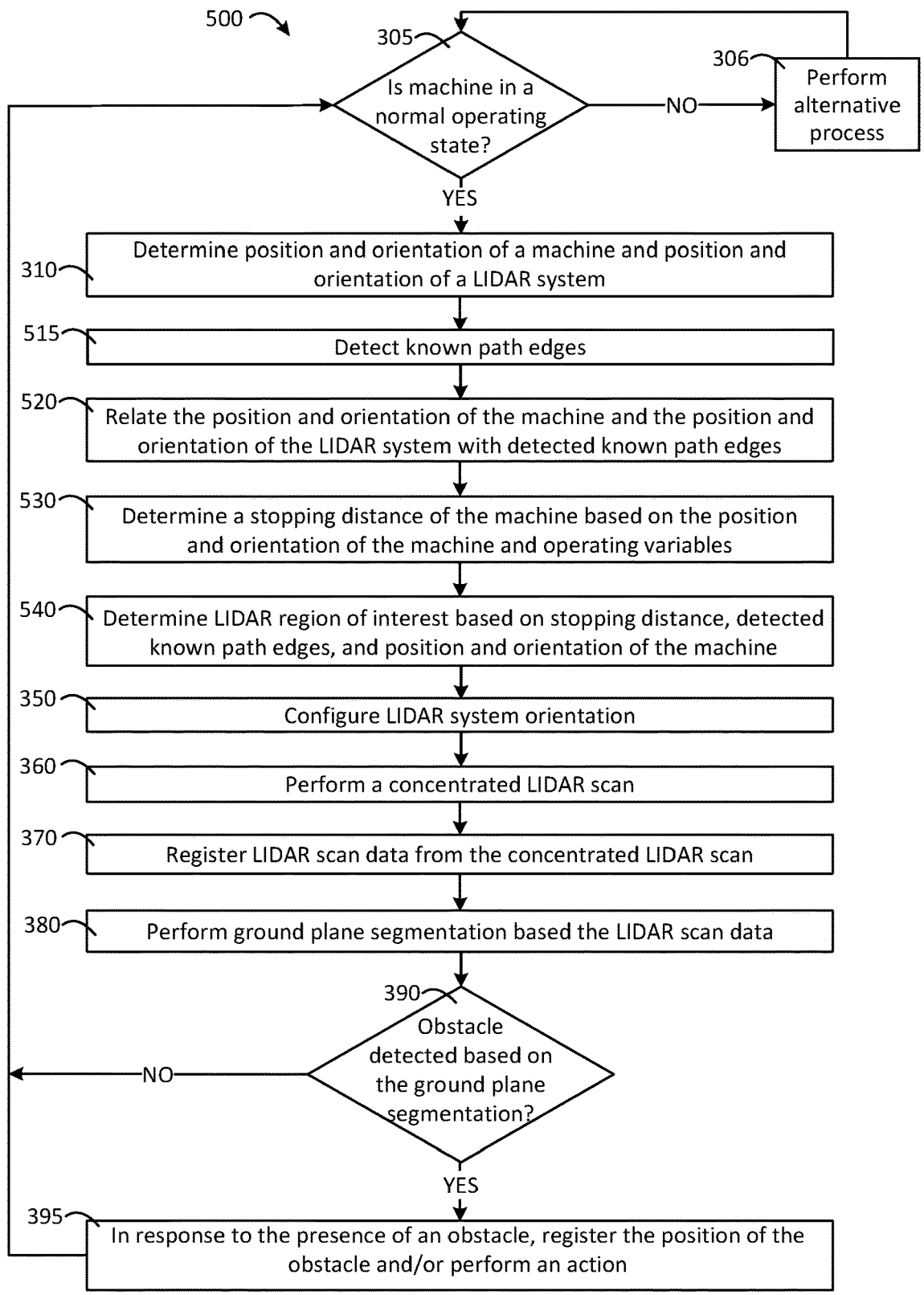
FIG. 8 is a flowchart of another method of detecting an obstacle.

Methods described in FIG. 7 and FIG. 8 may contain steps previously described with respect to FIG. 6. The steps in connection with earlier described embodiments may not be repeated here with the understanding that, when appropriate, that previous description applies to the embodiments depicted in FIG. 7 as well as FIG. 8. Additionally, the emphasis in the following description is on variations of previously introduced steps.

FIG. 7 is a flowchart of another method of detecting an obstacle. The method begins at block 305 and can include a check if the machine 10 is in a normal operating state. If the machine 10 is in a normal operating state, the method can proceed to block 310.

At block 310, the control system 200 can determine position and orientation of the machine 10.

The method can further proceed to block 420. Block 420 can be similar to block 320. At block 420, the control system 200 can relate the position and orientation of the machine 10 with a map. In an embodiment, the orientation and position of the LIDAR system can be in a fixed position and may be directly related with the orientation and position of the machine 10 and machine body 11.

The method can further proceed to block 330. At block 330, the control system 200 can determine a stopping distance of the machine based on the position and orientation of the machine, the map, and operating variables.

The method can further proceed to block 440. At block 440, the control system 200 can check if there are multiple known paths. If there is only a single known path 14, the method can proceed to block 441. At block 441, the control system 200 can determine the LIDAR region of interest 42 based on stopping distance, a known path 14, and the position and orientation of the machine 10. Block 441 can include the description for block 340. At block 441, the control system 200 can determine a LIDAR region of interest 42 with regards to the stopping distance, the map, and position and orientation of the machine 10. The LIDAR region of interest 42 can have a region of interest center point CP1. The region of interest center point CP1 can be located by measuring from the machine location out along a known route 46 at a distance equal to the stopping distance. In an example, the coverage area of the LIDAR region of interest 42 can be limited to a maximum area value. The width W1 of the LIDAR region of interest can be the first known path width. In other examples, the width W1 can be based on the width of the machine 10 or other predetermined values or ratios. The thickness T1 of the LIDAR region of interest 42 can be based on the number of lasers used in the concentrated field 40 and/or the width W1 of the LIDAR region of interest.

If there are multiple known paths 14 and 114, the method can proceed to block 442. At block 442, the control system 200 can determine LIDAR regions of interest 42 and 142 based on stopping distance, multiple known paths 14 and 114, and position and orientation of the machine 10.

In addition to the description of block 340, block 442 can include the following description. The second LIDAR region of interest 142 can have a second region of interest center point CP2. The second region of interest center point CP2 can be located by measuring from the machine location out along a secondary known route 146 at a distance equal to the stopping distance. In an example, the coverage area of the second region of interest 142 can be limited to a maximum area value. The width W2 of the second region of interest 142 can be the width W2 of the second known path. In other examples, the width W2 can be based on the width of the machine 10 or other predetermined values or ratios. The thickness T2 of the second region of interest 142 can be based on the number of lasers used in the concentrated field 40, the second concentrated field 140, and/or the width W2 of the second region of interest 142.

The method can further continue at block 460. At block 460, the control system 200 can perform a concentrated field 40, 140 based on the determined LIDAR region of interest 42 or regions of interest 42 and 142. The method can further continue at block 370. At block 370, the control system 200 can register the LIDAR scan data from the LIDAR scan. The method can further proceed to block 380. At block 380, the control system 200 can perform ground plane segmentation based on the LIDAR scan data.

Next at block 390, the control system 200 can check if an obstacle is detected within the LIDAR region of interest 42 and 142 based on the ground plane segmentation. If an obstacle 66 is not detected, the method proceeds to the beginning and starts again at block 305. If an obstacle 66 is detected within the LIDAR region of interest 42 and 142, the method proceeds to block 395.

At block 395, the control system 200 can register the position of the obstacle and/or perform an action.

FIG. 8 is a flowchart of another method of detecting an obstacle. The method begins at block 305 and can include a check if the machine 10 is in a normal operating state. If the machine 10 is in a normal operating state, the method can proceed to block 310.

At block 310, the control system 200 can determine position and orientation of the machine 10.

The method can further proceed to block 515. At block 515, the obstacle detection system 30 can detect known path edges 16 and 116 of a known path 14. The location of known path edges 16 and 116 can identify the geometry and existence of paths such as known path 14. The known path edges 16 and 116 can be detected by the LIDAR system 32 through a broad field 50. In other examples, the known path edges 16 and 116 can be detected by others systems that can be included as part of the obstacle detection system 30.

The method can further proceed to block 520. At block 520, the control system 200 can relate position and orientation of the machine 10 and position and orientation of the LIDAR system 32 with location and geometry of the detected known path edges 16 and 116.

The method can further proceed to block 530. At block 530, the control system 200 can determine a stopping distance of the machine 10 based on position and orientation of the machine 10 and operating variables previously described.

The method can further proceed to block 540. At block 540, the control system 200 can determine the LIDAR region of interest 42 and 142 based on stopping distance, the detected known path edges 16 and 116, and position and orientation of the machine 10. The detected known path edges 16 and 116, can define the known path or paths 14 and 114 and known routes 46, 146. The stopping distance can be related to the known routes 46, 146 to locate the LIDAR region of interest 42 and 142 with respect to the machine 10.

For example, the stopping distance can be used in determining the location of the region of interest center point CP1 AND CP2. The width W1 AND W2 of the LIDAR region of interest 42 and 142 can be equal to or in proportion to the distance between the known path edges 16 and 116 at or proximate to the region of interest center point CP1 AND CP2.

The method can further proceed to block 350. At block 350, the control system 200 can configure the LIDAR system orientation based on the location and dimensions of the LIDAR region of interest 42.

The method can further proceed to block 360. At block 360, the LIDAR system 32 can perform a LIDAR scan. The method can further continue at block 370. At block 370, the control system 200 can register the LIDAR scan data from the LIDAR scan. The method can further proceed to block 380. At block 380, the control system 200 can perform ground plane segmentation based on the LIDAR scan data.

The method can further proceed to block 390. At block 390, the control system 200 can check if an obstacle is detected within the LIDAR region of interest 42 and 142 based on the ground plane segmentation. If an obstacle 66 is not detected, the method proceeds to the beginning and starts again at block 305. If an obstacle 66 is detected within the LIDAR region of interest 42 and 142, the method proceeds to block 395.

At block 395, the control system 200 can register the position of the obstacle and/or perform an action.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

What is claimed is:

1. A method of detecting an obstacle at a minesite, the method comprising:
   determining a position and an orientation of a destination bound machine on a map of the minesite, the map of the minesite including a known path for a known route that the machine plans on taking from the current position of the machine to the destination within the minesite;
   determining a stopping distance of the machine based on the position and the orientation of the destination bound machine, the map of the minesite, a traveling speed of the machine, and a weight of the machine;

determining a LIDAR region of interest based on the stopping distance, the position and the orientation of the destination bound machine, and the known path;

configuring a LIDAR system orientation for a LIDAR system of the machine based on the determined LIDAR region of interest;

performing a concentrated LIDAR scan on the determined LIDAR region of interest to generate LIDAR scan data;

performing a ground plane segmentation operation based on the LIDAR scan data; and detecting whether an obstacle is present within the LIDAR region of interest based on the ground plane segmentation operation, wherein said determining the LIDAR region of interest includes setting a width of the LIDAR region of interest at opposing edges of the known path, wherein the concentrated LIDAR scan on the determined LIDAR region of interest is offset by a yaw angle from a machine orientation axis such that the concentrated LIDAR scan is aligned with a center portion of the determined LIDAR region of interest, and wherein the concentrated LIDAR scan on the determined LIDAR region of interest is offset downward from a horizontal pitch orientation axis of the machine such that, the concentrated scan matches dimensions and/or geometry of the LIDAR region of interest, including at the opposing edges of the known path.

2. The method of claim 1 further comprising:
determining a position and an orientation of the LIDAR system; and
configuring the LIDAR system orientation based on the position and the orientation of the LIDAR system and the map of the minesite.

3. The method of claim 2, further including performing a broad LIDAR scan based on a broad field of view angle, the broad LIDAR scan performed simultaneously with the concentrated LIDAR scan.

4. The method of claim 3, wherein a coverage area of the concentrated LIDAR scan is smaller than a coverage area of the broad LIDAR scan.

5. The method of claim 1, wherein the stopping distance is further based on road conditions of the minesite.

6. The method of claim 1, wherein the map of the minesite includes a secondary known path from the current position of the machine to the destination within the minesite, and the method further comprises:
determining a second LIDAR region of interest based on the stopping distance, the position and the orientation of the destination bound machine, and the secondary known path of the map of the minesite;
configuring the LIDAR system orientation based on the determined second LIDAR region of interest;
performing a second concentrated LIDAR scan based on the determined second LIDAR region of interest and configured LIDAR orientation to generate second LIDAR scan data;
performing the ground plane segmentation operation based on the second LIDAR scan data; and
detecting whether the obstacle is present based on the ground plane segmentation operation,
wherein the first concentrated LIDAR scan and the second concentrated LIDAR scan do not overlap in an overhead plan view including the machine.

7. The method of claim 6, further including, in response to the detected presence of the obstacle, registering a position of the obstacle and performing an action.

8. The method of claim 7, wherein said performing the action includes controlling the machine to avoid the obstacle by following the second known path.

9. The method of claim 2, further including adjusting the concentrated field of view angle of the LIDAR system based on the determined LIDAR region of interest.

10. A method of detecting an obstacle along a known path of a destination bound machine in the form of a haul truck having a LIDAR system at a worksite, the method comprising:
determining position and orientation of the haul truck on a map of the worksite, the map of the worksite including at least one known path from the current position of the haul truck to the destination within the worksite;
determining a stopping distance of the haul truck based on the position and the orientation of the destination bound haul truck, the map of the worksite, a traveling speed of the haul truck, and a weight of the haul truck;
determining whether multiple possible paths are present based on at least the map of the worksite;
in response to a presence of multiple known paths, determining LIDAR regions of interest based on the stopping distance, the position and the orientation, and the multiple known paths;
performing a LIDAR scan based on the LIDAR regions of interest;
performing a ground plan segmentation operation based on the LIDAR scan; and
detecting whether an obstacle is present based on the ground plane segmentation operation,
wherein said determining the LIDAR regions of interest includes setting respective widths of the LIDAR regions of interest at opposing edges of the multiple known paths, and
wherein the concentrated LIDAR scans on the determined LIDAR regions of interest includes offsetting downward from a pitch orientation axis of the haul truck the concentrated LIDAR scans such that the concentrated LIDAR scans match respective dimensions and/or geometry of the LIDAR regions of interest, including at the opposing edges of the multiple known paths.

11. The method of claim 10, wherein the multiple known paths include a first known path including a primary known route for the haul truck to follow during operation, and
a second known path including a secondary known route for the haul truck to alternatively follow during operation; and
wherein the method further includes, in response to the presence of the obstacle along the primary known route, controlling the haul truck to follow the secondary known route.

12. The method of claim 10, wherein each of the determined LIDAR regions of interest is limited by a predetermined maximum width value.

13. The method of claim 10, wherein each of the determined LIDAR regions of interest is limited by known obstacles.

14. The method of claim 10, wherein each of the determined LIDAR regions of interest is adjusted based on environmental conditions.

15. The method of claim 10, wherein the map further includes path width and path slope data along the at least one known path.

16. An obstacle detection system for a destination bound, offroad load-moving working machine at a worksite, the obstacle detection system comprising:

a LIDAR system operable to perform a concentrated LIDAR scan; and a control system communicatively coupled to the LIDAR system and operable to determine position and orientation of the offroad load-moving working machine on a map of the worksite, the map including at least one known path from the current position of the offroad load-moving working machine to the destination within the worksite, determine a stopping distance of the offroad load-moving working machine based on the position and the orientation of the destination bound offroad load-moving working machine, the map of the worksite, a traveling speed of the offroad load-moving working machine, and a weight of the offroad load-moving working machine, and determine a LIDAR region of interest based on the stopping distance, the position and the orientation, and the at least one known path of the map, wherein the determination of the LIDAR region of interest includes the control system setting a width of the LIDAR region of interest at opposite edges of the known path, wherein the concentrated LIDAR scan on the determined LIDAR region of interest is offset downward from a pitch orientation axis of the offroad load moving working machine such that the concentrated LIDAR scan matches dimensions and/or geometry of the LIDAR region of interest, including at the opposing edges of the known path, and wherein the concentrated LIDAR scan on the determined LIDAR region of interest is offset by a yaw angle from a machine orientation axis such that the concentrated LIDAR scan is aligned with a center portion of the determined LIDAR region of interest.

17. The obstacle detection system of claim 16, wherein the LIDAR system is further operable to perform the concentrated LIDAR scan based on the determined LIDAR region of interest; and the control system is further operable to perform a ground plane segmentation operation based on the LIDAR scan data; and detect when the obstacle is present within the LIDAR region of interest based on the ground plane segmentation operation.

18. The obstacle detection system of claim 17, wherein the control system is further operable to, in response to a detection of the presence of the obstacle, register a position of the obstacle on the map of the worksite and performing an action.

19. The method of claim 18, wherein performing the action further includes controlling the offroad load-moving working machine to slow down.

* * * * *